(12) United States Patent
Lajeunesse et al.

(10) Patent No.: US 10,563,140 B2
(45) Date of Patent: Feb. 18, 2020

(54) INSTALLATION AND PROCESS FOR JOINTLY IMPLEMENTING COMPRESSION OF THE ACID GASES FROM THE HYDROCONVERSION OR HYDROTREATMENT UNIT AND THAT OF THE GASEOUS EFFLUENTS FROM THE CATALYTIC CRACKING UNIT

(71) Applicant: AXENS, Rueil Malmaison (FR)

(72) Inventors: Odile Lajeunesse, Rueil-Malmaison (FR); Nicolas Lambert, Issy-les-Moulineaux (FR); Jacinthe Frecon, Rueil-Malmaison (FR); Jerome Pigourier, Meudon (FR)

(73) Assignee: AXENS, Rueil Malmaison (FR)

(*) Notice: Subject to any disclaimer, the term of this patent is extended or adjusted under 35 U.S.C. 154(b) by 283 days.

(21) Appl. No.: 15/388,312

(22) Filed: Dec. 22, 2016

(65) Prior Publication Data
US 2017/0183584 A1 Jun. 29, 2017

(30) Foreign Application Priority Data
Dec. 23, 2015 (FR) ..................................... 15 63172

(51) Int. Cl.
*C10G 69/04* (2006.01)

(52) U.S. Cl.
CPC ..... *C10G 69/04* (2013.01); *C10G 2300/1074* (2013.01); *C10G 2300/1077* (2013.01); *C10G 2300/202* (2013.01)

(58) Field of Classification Search
CPC ........ C10G 69/04; C10G 11/18; C10G 45/02; C10G 47/00; C10G 49/22; C10G 2300/1074; C10G 2300/1077; C10G 2300/202; B01D 3/4216
See application file for complete search history.

(56) References Cited

U.S. PATENT DOCUMENTS

| 3,371,029 | A | * | 2/1968 | Weiland | C10G 5/00 203/73 |
| 3,733,260 | A | * | 5/1973 | Davies et al. | C10G 49/22 208/208 R |
| 2003/0075485 | A1 | * | 4/2003 | Ghijsen | C10G 70/04 208/308 |
| 2008/0289588 | A1 | * | 11/2008 | Wees | F01K 13/00 122/406.1 |
| 2011/0240519 | A1 | * | 10/2011 | Jan | B01J 38/30 208/70 |
| 2013/0043159 | A1 | | 2/2013 | Hoehn et al. | |
| 2015/0273425 | A1 | | 10/2015 | Zhu et al. | |

OTHER PUBLICATIONS

Search Report dated Sep. 6, 2016 issued in corresponding FR 1563172 application (2 pages).

* cited by examiner

*Primary Examiner* — Prem C Singh
*Assistant Examiner* — Brandi M Doyle
(74) *Attorney, Agent, or Firm* — Millen, White, Zelano and Branigan, P.C.

(57) ABSTRACT

An installation and a process which jointly implement compression of acid gases from a hydroconversion or hydrotreatment unit and gaseous effluents from a catalytic cracking unit.

13 Claims, 2 Drawing Sheets

INSTALLATION AND PROCESS FOR JOINTLY IMPLEMENTING COMPRESSION OF THE ACID GASES FROM THE HYDROCONVERSION OR HYDROTREATMENT UNIT AND THAT OF THE GASEOUS EFFLUENTS FROM THE CATALYTIC CRACKING UNIT

CONTEXT OF THE INVENTION

The invention concerns the field of processes for the hydroconversion of atmospheric or vacuum residues, or vacuum gas oil or distillates, or for the hydrotreatment of vacuum gas oil or distillates. The conventional hydroconversion or hydrotreatment processes comprise a section for fractionating the effluent from the reaction section which mainly implements two objectives, the removal of H2S and the light hydrocarbons and main fractionating of the products of the unit. The elimination of H2S and the light hydrocarbons gives rise to the production of acid gases which then have to be purified before being used as a fuel gas.

Figure 1:
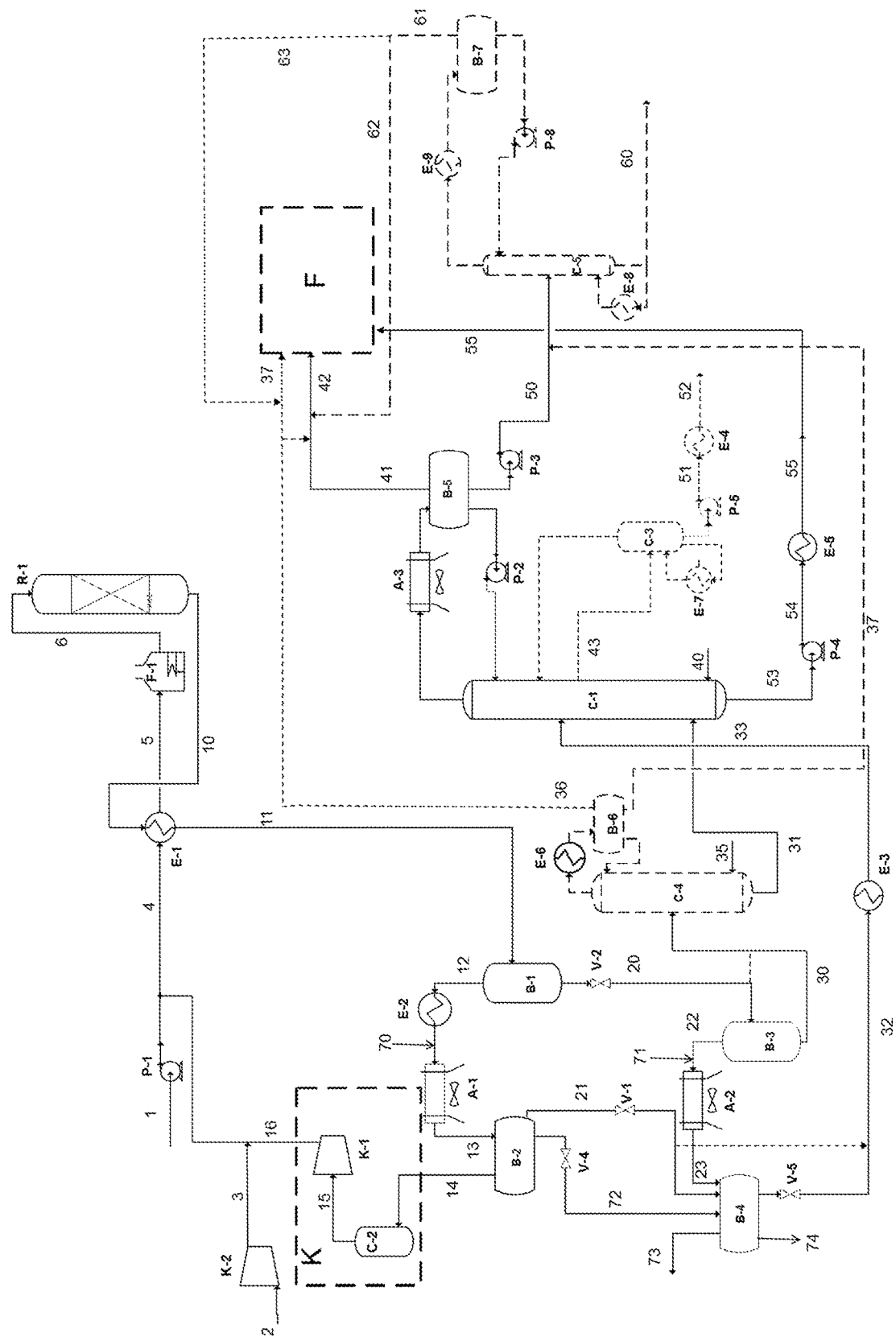
FIG. 1 shows a diagrammatic view of the hydrotreatment or hydroconversion reaction section R-1 comprising the section for fractionating the reaction effluents with the main fractionating column C-1 and different separator vessels identified at B-1 to B-5.

Three optional sections are marked in broken line in FIG. 1:
- a separation section for treating an intermediate effluent 43 issuing from the main fractionating column C-1 and comprising a column C-3;
- a separation section for treating the bottoms effluent of the separator vessel B-3 and comprising a column C-4; and
- a section for stabilisation of the naphtha issuing from the fractionating column C-1 which makes it possible to eliminate the residual acid gases from the naphtha and comprising a column C-5.

Figure 2:
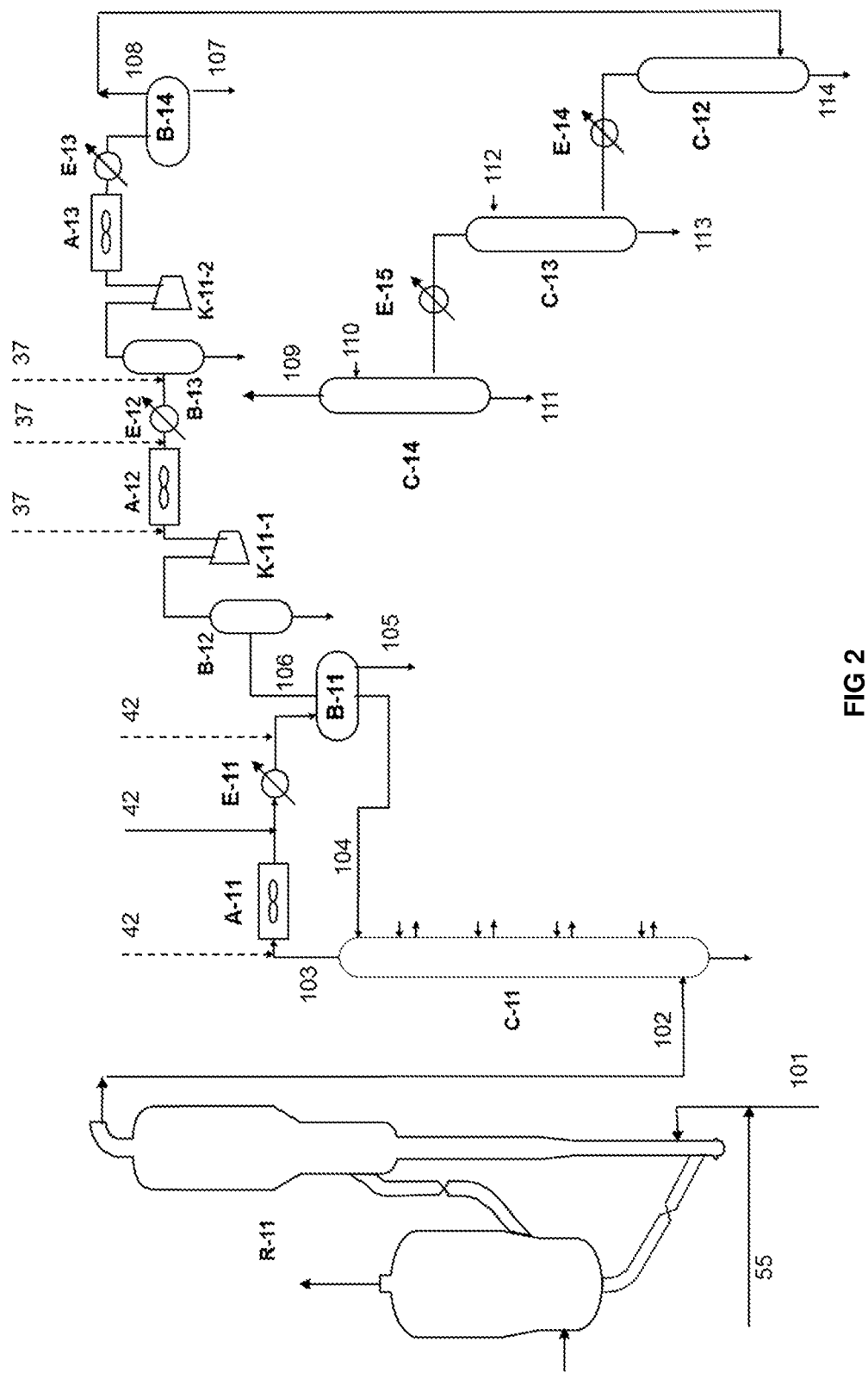

The rectangle F in FIG. 1 indicates the placement of the connection of that section to the catalytic cracking section shown in FIG. 2.

FIG. 2 shows a diagrammatic view of the catalytic cracking reaction section R-11 with its fractionating zone for the cracked gases comprising the column C-11, and the compressor for said cracked gases K-11, doubled as K-11-1 and K-11-2. The feedstock of the catalytic cracking unit 55 essentially comes from the bottoms flow of the fractionating column C-1.

EXAMINATION OF THE PRIOR ART

U.S. Pat. No. 3,733,260 describes a process for the hydrodesulphurisation of gas oils comprising a hydrodesulphurisation reaction section, separation of the effluent from that section into a gaseous fraction and a first fraction which is liquid at high temperature and at high pressure, partial condensation of said vapour phase into a fraction substantially comprising hydrogen, and a second liquid fraction, stripping of the H2S and the light hydrocarbons from the first and second liquid fractions by means of previously treated hydrogen, separation of the stripped hydrocarbons into a naphtha and a gas oil, and recycling of said naphtha to the condensation step.

The presence of that stripper upstream of the main fractionating operation makes it possible to eliminate the acid gases at a sufficiently high pressure to be passed to the fuel gas network of the refinery after treatment with amines. However that configuration requires the generation of a reflux for the stripping operation and suffers from the disadvantage of dissipating a part of the energy contained in the effluent from the reaction section in the head air condenser of the stripper. In addition the optimum temperature required for the feed to the stripping operation being lower than the minimum temperature required for the downstream separation operation, that necessitates heating of the feedstock of that separation operation and therefore generally the presence of a furnace on the feedstock of the main fractionating operation.

U.S. Pat. No. 3,371,029 describes a process for separating effluent from a reactor for the conversion of hydrocarbons containing hydrogen in which (see Table IV flow 22-27) there is no step for stripping H2S and hydrocarbons upstream of the main hydrocarbon separation operation.

That configuration has the advantage over U.S. Pat. No. 3,733,260 that the temperature at the hot separator vessel is so selected as to supply the main fractionating column with the heat required to vaporise the light fraction issuing from the reactions for conversion of the hydrocarbons in the reactor. In that system however the acid gases are not eliminated upstream of the main separation operation. That section being operated at a pressure close to atmospheric pressure the acid gases have to be compressed before being passed towards a fuel gas network of a refinery.

The process according to the invention overcomes those disadvantages by eliminating the head compressor of the main fractionating column of the hydroconversion or hydrotreatment section, by virtue of integration with the compressor for recovery of the gaseous effluent from the catalytic cracking unit.

BRIEF DESCRIPTION OF THE INVENTION

The present invention describes a hydroconversion or hydrotreatment installation, for example for hydrodesulphurisation, with a view to constituting the feedstock of a catalytic cracking unit, for example a cut of type vacuum gas oil (VGO), vacuum distillate (VD) or vacuum residue, or deasphalted oil (DAO), said installation comprising at least:
- a reaction section R1 for implementing hydrotreatment or hydroconversion of a feedstock intended to feed a catalytic cracking unit,
- one or more high-pressure separator vessels B1 and/or B2 whose feedstock is formed by the effluent issuing from the reaction section R1,
- a compression zone K for implementing compression of the gaseous effluent issuing from B-1 and/or B-2, also referred to as recycled hydrogen, said compressed gaseous effluent being reintroduced into the reaction zone R-1,
- a fractionating column C-1 fed by the bottoms of the high-pressure separator vessels B-1 and B-2, said column C-1 separating at least a head cut, a naphtha cut, and a heavy cut of which at least a part feeds the catalytic cracking section R-11,
- a furnace F-1 for heating the feedstock of the reaction section R1 or solely the hydrogen necessary for said reaction zone, or again both hydrogen and the feedstock, a catalytic cracking reaction section R-11 fed by at least a part of the heavy fraction issuing from the fractionating column C-1, a second fractionating column C-11 for the effluents from the catalytic cracking reaction section R-11, and a recovery compressor K-11 for compressing at least a part of the gaseous effluent from the catalytic cracking unit and the acid gases issuing from the main fractionating column C-1, which compressor K-11 may comprise a plurality of stages.

Preferably the installation according to the invention further comprises medium-pressure separator vessels B-3 and B-4 respectively fed by the bottoms effluents of the vessels B-1 and B-2 and the fractionating column C-1 is fed by the bottoms of the vessel B-4 and ultimately by the bottoms of the vessel B-3.

Preferably the installation according to the invention comprises at least one high-pressure separator vessel B-14 whose gaseous outlet can be passed towards one or more absorption columns C-12 to C-14 and whose liquid outlet can be passed to the fractionating column C-11 for the gaseous effluent from the catalytic cracking unit R-11.

The gaseous effluent issuing from the absorption column or columns C-12-C-14 may possibly be passed towards an amine and/or lye treatment in order to remove the sulphur compounds.

The installation according to the invention may also preferably comprise a section for stabilisation of the naphtha issuing from the fractionating column C-1 permitting elimination of the residual acid gases from the naphtha and comprising a separation column C-5 of which the head fraction rejoins the compressor for the cracked gases of the catalytic cracking unit.

The installation according to the invention may also preferably comprise an intermediate column C-3 fed by an intermediate fraction issuing from the main fractionating column C-1.

The installation according to the invention may also preferably comprise a stripper C-4 upstream of the fractionating column C-1, fed by the bottoms flow from the vessel B-3 or B-1, said stripper C-4 permitting elimination of a gas part and in particular H2S issuing from the reactions of the reaction section R-1, which is passed to the recovery compressor K-11.

The invention also concerns a process using the above-described installation. In the process and installation according to the invention the reaction section of the hydroconversion or hydrotreatment unit R-1 may comprise one or more reactors arranged in series or in parallel, for example two reactors arranged in series.

Each reactor of the reaction section comprises at least one catalyst bed.

The catalyst may be used in a fixed bed or in an expanded bed or again in a bubbling bed. In the case of a catalyst used in a fixed bed it is possible to arrange a plurality of beds of catalysts in at least one reactor.

Any catalyst known to the man skilled in the art may be used in the process according to the invention, for example a catalyst comprising at least one element selected from the elements of group VIII of the periodic classification (groups 8, 9 and 10 of the new periodic classification) and optionally at least one element selected from the elements of group VIB of the periodic classification (group 6 of the new periodic classification).

The operating conditions of the hydrotreatment or hydroconversion unit R-1 are generally the following:

the temperature is typically between about 200 and about 460° C., the total pressure is typically between about 1 MPa and about 20 MPa, generally between 2 and 20 MPa, preferably between 2.5 and 18 MPa and very preferably between 3 and 18 MPa, the overall hourly space velocity of liquid feedstock for each catalytic step is typically between about 0.1 and about 12 and generally between about 0.4 and about 10 (the hourly space velocity being defined as the ratio of the volumetric flow rate of feedstock to the volume of catalyst), the purity of the hydrogen used in the process according to the invention is typically between 50 and 100% by volume, and the amount of hydrogen in relation to the liquid feedstock is typically between about 50 and about 1200 Nm3/m3.

In the process and installation according to the invention the reaction section of the catalytic cracking unit R-11 may comprise one or more reactors disposed in series or in parallel, operating in a fluidised or bubbling mode of operation, with a rising or falling flow of the catalyst. That reaction section may also comprise one or more regenerators arranged in series or in parallel which can preferably be fitted with elements seeking to supply heat to or take heat from the system (catalyst cooler referred to as a "cat cooler" using English terminology, air reheater, etc.)

Any catalytic formulation which may or may not comprise additives of type ZSM-5 known to the man skilled in the art may be used in the reaction section of the catalytic cracking unit.

The operating conditions of the catalytic cracking unit R-11 are generally the following:

the reaction zone outlet temperature is typically between about 470 and about 650° C., preferably between 500 and 550° C., the outlet pressure of the reaction zone is typically between about 0.05 MPa g and about 2.25 MPa g, preferably between 0.1 and 0.2 MPa g, the residence time of the feedstock in the reaction zone is typically between about 0.5 seconds and about 20 seconds, preferably between 1 and 4 seconds, and the amount of circulating catalyst related to the amount of injected fresh feedstock is typically between about 3 and about 25 m3/m3, preferably between 4 and 10 m3/m3.

In a variant of the process according to the invention an intermediate fraction is extracted from the fractionating column C-1, said intermediate fraction being passed into an intermediate column C-3 and the bottoms fraction of the column C-3 being cooled by means of an exchanger E-4.

According to a variant of the process according to the invention the pressure of the separation column C-4 is selected to be sufficiently high for the acid gases issuing from said separation operation to be directed towards an intermediate stage of the compressor K-11 for the cracked gases of the catalytic cracking section R-11.

According to a variant of the process according to the invention the pressure of the separation column C-5 is selected to be sufficiently high for the acid gases issuing from said separation operation to be directed towards an intermediate stage of the compressor K-11 for the cracked gases of the catalytic cracking section R-11.

The installation and the process according to the invention are distinguished from the prior art in that they provide for joint implementation of compression of the acid gases of the hydroconversion or hydrotreatment unit R-1 and the gaseous effluents from the catalytic cracking unit R-11 by using the compressor for the cracked gases (also referred to as the recovery compressor) K-11. The resulting advantage in terms of capital investment is correspondingly greater in proportion to the additional feedstock flow rate of the compressor for the cracked gases from the catalytic cracking unit K-11 being low in relation to the total flow rate that that compressor involves. Consequently the marginal cost for the cracked gas compressor is low in relation to the gains afforded by suppression of the head compressor of the main fractionating section of the hydroconversion or hydrotreatment unit.

Another advantage of the invention is to permit recovery of the LPGs and naphtha present in the acid gases from the hydroconversion or hydrotreatment unit in the dedicated section within the catalytic cracking unit.

DETAILED DESCRIPTION OF THE INVENTION

FIGS. 1 and 2 describe one of the possible embodiments of the installation and the process according to the invention.

FIG. 1 shows the hydrotreatment or hydroconversion section R-1 with the fractionating column C-1 whose bottoms fraction 53 becoming 55 is passed towards the catalytic cracking unit R-11 represented by the rectangle F.

FIG. 2 shows the catalytic cracking section R-11 with its column C-11 for fractionating the cracked gases and the cracked gas compressor or compressors K-11, identified as K-11-1 and K-11-2.

Hereinafter in the description and without this constituting any limitation whatsoever the hydrotreatment R-1 is hydrodesulphurisation.

The feedstock, for example a vacuum residue, is fed by way of the line 1 (FIG. 1) by way of the pump P-1. The hydrogen which is preferably in excess with respect to the feedstock is fed by way of the line 2 and compressor K-2 and then line 3 and mixed with the feedstock 1 before being admitted into a feedstock-effluent exchanger (E-1) by way of the line 4. The exchanger E-1 makes it possible to preheat the feedstock by means of the effluent from the hydrodesulphurisation reactor R-1. After that exchange the feedstock is fed by way of the line 5 into a furnace F-1 which makes it possible to attain the temperature level necessary for the hydrodesulphurisation reaction, and then the hot feedstock is passed by way of the line 6 into the hydrodesulphurisation section formed by at least one hydrodesulphurisation reactor R-1 comprising at least one hydrodesulphurisation catalyst.

The effluent from the reactor R-1 is then passed towards the exchanger E-1 by the line 10 and then by way of the line 11 towards the high-pressure hot separator vessel B-1. A gaseous fraction is separated in that vessel and recovered by way of the line 12. The at least partially desulphurised liquid fraction is recovered at the bottom by way of the line 20 and passes to the vessel B-3 again by way of the valve V-2. The gaseous fraction 12 comprises unreacted hydrogen, hydrogen sulphide (H2S) formed in the reaction as well as generally light hydrocarbons issuing from conversion of the hydrocarbons of the feedstock in the hydrodesulphurisation reaction section R-1.

After cooling in an exchanger E-2 and an air condenser A-1 the gaseous fraction 12 is passed by way of the line 13 into a high-pressure cold separator vessel B-2 permitting both implementation of a gas-liquid separation operation and settlement of the aqueous liquid phase.

The liquid hydrocarbon phase issuing from the separator vessel B-2, after expansion in the valve or the liquid turbine V-1, is directed towards a medium-pressure cold separator vessel B-4 by way of the line 21. The water which is also separated in the vessel B-2 is preferably passed by way of the line 72 towards the vessel B-4.

The gaseous fraction issuing from the high-pressure cold separator vessel B-2 is passed by way of the line 14 towards an amine absorber or a washing column C-2 permitting elimination at least of a part of the H2S, then the gaseous fraction containing hydrogen is recycled by way of the lines 15 and 16 to the hydrodesulphurisation reactor R-1 after compression by means of the compressor K-1 and mixed with the feedstock 1.

The liquid effluent from the vessel B-1, after expansion in the valve or the liquid turbine V-2, is directed towards a medium-pressure hot separator vessel B-3 by way of the line 20.

A gaseous fraction is separated in the vessel B-3 and recovered by way of the line 22. The gaseous fraction comprises unreacted hydrogen, hydrogen sulphide (H2S) formed in the reaction and generally light hydrocarbons from conversion of the hydrocarbons of the feedstock in the hydrodesulphurisation reaction section R-1.

After cooling in an air condenser A-2 that fraction is directed by way of the line 23 to the medium-pressure cold separator vessel B-4. The at least partially desulphurised liquid fraction is recovered at the bottom, expanded across the valve V-5 and directed by way of the line 32 towards the fractionating column C-1 after passing into the exchanger E-3.

Water is evacuated at the vessel bottom B-4 by way of the line 74 and gases are discharged by way of the line 73.

The liquid effluent from the vessel B-4 feeds the fractionating column C-1 by way of the lines 32 and 33 after expansion by way of the valve V-5 and heating in the exchanger E-3.

The fractionating column C-1 is operated at low pressure (about 0.2 MPa). The heat necessary for separation is preferably supplied by the temperature of the hot separator vessel B-3. The main fractionating column C-1 is also fed by stripping steam by way of the line 40.

The head fraction of the fractionating column C-1 is passed after cooling into an air refrigerating unit E-3, into the vessel B-5.

A recovered head fraction issues at the head of the vessel B-5 by way of the line 41, containing the residual acid gases which are passed by way of the line 42, either upstream of the air condenser A-11 or downstream of the exchanger E-11, or again downstream of that exchanger (line and lines 42 shown in detail in FIG. 2).

The product obtained at the bottom of the separator vessel B-5 is discharged by way of the line 50 provided with a pump P-3. That stream 50 is formed by naphtha cuts having a final boiling point of lower than 200° C. Another part of the bottoms liquid from the vessel B-5 is passed by way of the pump P-2 to the head of the separation column C-1.

In a preferred variant of the invention a stabilisation column C-5 for the naphtha from the fractionating column C-1 by way of the line 50 makes it possible to eliminate the residual acid gases of the naphtha produced and exported by way of the line 60 after cooling in the exchanger E-8. The acid gases which are thus recovered at the head of the separation operation in the column C-5 are also directed towards the compressor of the catalytic cracking unit by way of the line 61, 62 and then 42, or 63 and then 37, after cooling in the exchanger E-9 and then passing into the vessel B-7. At the vessel bottom B-7 a liquid fraction is recovered, which is recycled to the column C-5 by way of the pump P-8.

The pressure in the separation column C-5 can be selected to be sufficiently high for the acid gases issuing from that separation operation to be directed towards an intermediate stage of the compressor K-11 by way of the line 37.

The intermediate fraction issuing from the main fractionating column C-1 by way of the line 43 is passed into the intermediate column C-3. The bottoms fraction from the column C-3 by way of the line 51 and the pump P-5 is cooled by means of an exchanger E-4 and then recovered by way of the line 52. The column C-3 is equipped with a reboiler E-7.

Preferably the stream 52 is a gas oil cut having a distillation temperature at 95% volume (in accordance with the standard NF EN ISO 3405) of less than 360° C.

The heavy fraction issuing from the main fractionating column C-1 by way of the line 53 is cooled by means of the exchanger E-5 after passing through the pump P-4. The fraction obtained in that way by way of the line is a hydrotreated vacuum gas oil, in the present case being desulphurised, which constitutes the main feedstock of the catalytic cracking section (see FIG. 2). That main feedstock may be supplemented by various other feedstocks introduced by way of the line 101.

In another operating mode it is possible to recover by way of the line 50 a fraction ranging from naphtha to light gas oil and, by way of the line 55, a heavy gas oil fraction. In that case the fractionating column C-1 does not comprise an intermediate column C-3 and the lines 51 and 52 are absent.

The feedstock of the catalytic cracking unit R-11 is formed at least in part by the heavy fraction 55 issuing from the main fractionating column C-1 of the hydrodesulphurisation unit R-1, to which other external feedstocks may be added by way of the line 101.

The combined feedstock of the catalytic cracking unit (streams 55 and 101) is injected into the reaction section R-11 (FIG. 2), in which it is brought into contact with the hot catalyst issuing from the regeneration zone in order to proceed with the catalytic cracking reactions.

The hot effluent from the reactor R-11 issuing in gaseous form at the head of the reaction zone of R-11 is then passed by way of the line 102 to the bottom of the main fractionating column C-11 at high temperature (typically more than 500° C.).

By virtue of different circulating refluxes (not described here) different cuts are extracted from the fractionating column C-11.

The gaseous light fraction at lower temperature (typically between about 100° C. and 130° C.) and at low pressure (typically around 1 bar (0.1 MPa) effective) issues from C-11 by way of the line 103. It is then cooled in an air condenser A-11 and then a water cooler E-11 before passing into the reflux vessel B-11 of the main fractionating column C-11, which vessel B-11 makes it possible both to implement gas-liquid separation and settlement of the aqueous liquid phase eliminated by the line 105. Upstream of the reflux vessel B-11 the gaseous head fraction from the main fractionating column C-1 of the hydrodesulphurisation unit is injected, having been recovered by way of the line 41 and then 42. The different points for the introduction of the gaseous fraction 42 are all disposed upstream of the reflux vessel B-11.

In a variant of the invention a stripper C-4 may be implemented upstream of the fractionating column C-1. The stripper C-4 aims to eliminate a gas part, in particular H2S, issuing from the reactions of the reaction section R-1.

That column C-4 is fed by the bottoms stream from the vessel B-3 by way of the line 30. The column C-4 is preferably stripped by means of any stripping gas introduced by way of the line 35 such as for example a gas containing hydrogen or steam. Preferably steam is used to carry out the stripping operation. The acid gases issuing from the head of the stripping column C-4 are directed into the catalytic cracking section R-11 by way of the lines 36 and then 37 after cooling in the condenser E-6 and passing into the reflux vessel B-6.

The pressure of the separation column C-4 may indeed be selected to be sufficiently high for the acid gases from that separation operation to be capable of being directed towards an intermediate stage of the compressor K-11 by way of the line 37. The most appropriate injection point will depend on the temperatures and pressures in order to minimise energy consumption.

A part of the liquid hydrocarbon phase issuing from the separator vessel B-11 is passed as reflux to the column C-11 by way of line 104 while the rest is directed towards the secondary fractionating operation by way of the line 105 in order to more finely separate the light gases from the LPGs, gasoline and heavier fractions (that secondary fractionating operation is neither described nor shown in FIG. 2).

The vapour hydrocarbon phase issuing from the separator vessel B-11 is directed by way of the line 106 towards the separator vessel B-12 then towards the suction of the first stage K-11-1 of the cracked gas compressor K-11. The discharge from K-11-1 is successively cooled in an air condenser A-12, then a water cooler E-11, before passing into the separator vessel B-13.

The liquid fractions recovered at the bottom of the vessels B-12 and B-13 are recycled towards the main fractionating operation C-11 or the secondary fractionating operation (not described here).

The vapour fraction issuing from the separator vessel B-13 is directed towards the suction of the second stage K-11-2 of the cracked gas compressor K-11. The discharge from K-11-2 is successively cooled in an air condenser A-13 and then a water cooler E-13 before passing, in accordance with a preferred variant, into a high-pressure separator vessel B-14 which makes it possible both to implement gas-liquid separation and settlement of the aqueous liquid phase by way of the line 107.

Still in accordance with this preferred variant the liquid hydrocarbon phase from the separator vessel B-14 is directed towards the secondary fractionating operation by way of the line 107 in order to more finely separate the hydrocarbons recovered in liquid form while the aqueous liquid phase is passed to the appropriate treatment (not described here).

The vapour hydrocarbon phase issuing from the separator vessel B-14 is directed by way of the line 108 into one or more absorption columns C-12, C-13, C-14 in order to gradually eliminate the last species heavier than the fuel gas by bringing it into contact with lighter and lighter hydrocarbon cuts issuing from the secondary fractionating operation (not described here).

The gaseous hydrocarbon effluents from the absorption columns C-12 and C-13 are cooled with water in the exchangers E-14 and E-15 respectively. The sulphur compounds, in particular H2S, are eliminated in an amine absorption column C-14 before being passed to the fuel gas network of the refinery by way of the line 109. The solution of amines is respectively introduced by the lines 110 and 112. Supplementary steps for purification of that vapour stream can possibly be implemented if necessary. The bottoms streams of the columns C-12, C-13 and C-14, at 114, 113 and 111 respectively, are the products of the process of which use can be made, after a possible post-treatment.

EXAMPLES

Table 1 hereinafter shows the results obtained in accordance with the system of the prior art, that is to say with the compressor for the head gases of the main fractionating column C-1, and in accordance with the invention, that is to say with only the compressor K-11 for the cracked gases of the catalytic cracking unit R-11, equally treating the head gases of the fractionating column C-1.

The example according to the invention corresponds to the layout in FIGS. 1 and 2 without the optional columns C-3, C-4, C-5 nor the corresponding sections represented in broken lines in FIG. 1.

In accordance with the layout of the invention the head compressor of the main fractionating column C-1 of the hydroconversion or hydrotreatment section R-1 is suppressed by virtue of integration with the recovery compressor for the gaseous effluent K-11 of the catalytic cracking unit.

The increase in the total flow rate at the inlet of the compressor K-11 of the catalytic cracking section due to the additional stream 42 is very low (of the order of 1%).

Moreover the amount of naphtha recovered downstream of the reaction section of the catalytic cracking unit R-11 and after hydrodesulphurisation and fractionation is increased by 0.5% and the additional amount of LPG recovered is about 1%.

The apparatus and the process according to the invention therefore make it possible to economise on the head compressor of the main fractionating column C-1 without significantly increasing the capacity of the compressor K-11 of the catalytic cracking section and therefore to economise in terms of capital investment and operating costs with substantially identical and indeed even slightly enhanced levels of performance.

TABLE 1

| Composition of the | % by weight | | t/h | |
|---|---|---|---|---|
| feedstock of the compressor K-11 of the catalytic cracking unit | Prior art | According to the invention | Prior art | According to the invention |
| $H_2S$ | 0.333 | 0.17 | 0.15 | 0.81 |
| Dry gas ($H_2$—$C_1$-$C_2$) | 8.53 | 8.62 | 39.33 | 40.08 |
| LPG ($C_3$-$C_4$) | 38.25 | 38.29 | 176.34 | 177.94 |
| Gasoline $C_5$-220° C.) | 31.24 | 31.16 | 144.05 | 144.82 |

The invention claimed is:

1. A hydroconversion or hydrotreatment installation capable of producing a feedstock to a catalytic cracking unit, a cut of vacuum gas oil (VGO), vacuum distillate (VD) or vacuum residue, or deasphalted oil (DAO), said installation comprising at least:
   a reaction section R-1 for implementing hydrotreatment or hydroconversion of a feedstock intended to feed a catalytic cracking unit,
   one or more high-pressure separator vessels B-1 and/or B-2 whose feedstock is formed by the effluent issuing from the reaction section R-1,
   a compression zone K for implementing compression of gaseous effluent issuing from B-1 and/or B-2, also referred to as recycled hydrogen, said compressed gaseous effluent being reintroduced into the reaction section R-1,
   a fractionating column C-1 fed by bottoms effluents from the high-pressure separator vessels B-1 and B-2, said column C-1 separating at least a head cut, a naphtha cut, and a heavy cut of which at least a part feeds a catalytic cracking section R-11,
   a furnace F-1 for heating the feedstock of the reaction section R-1 or solely hydrogen necessary for said reaction zone, or again both hydrogen and the feedstock,
   catalytic cracking reaction section R-11 fed by at least a part of the heavy fraction issuing from the fractionating column C-1,
   a second fractionating column C-11 for effluents from the catalytic cracking reaction section R-11, and
   a recovery compressor K-11 for compressing at least a part of gaseous effluent from the catalytic cracking reaction section R-11 and acid gases issuing from the fractionating column C-1, which compressor K-11 may comprise a plurality of stages.

2. An installation according to claim 1 further comprising medium-pressure separator vessels B-3 and B-4 respectively fed by the bottoms effluents of the vessels B-1 and B-2 and in which the fractionating column C-1 is fed by the bottoms of the vessels B-3 and B-4.

3. An installation according to claim 1 and further comprising at least one high-pressure separator vessel B-14 having a gaseous outlet to one or more absorption columns and a liquid outlet to the fractionating column C-11 for the gaseous effluent from the catalytic cracking unit R-11.

4. An installation according to claim 1 and further comprising a section for stabilization of naphtha issuing from the fractionating column C-1 permitting elimination of the residual acid gases from the naphtha and comprising a separation column C-5 of which the head fraction rejoins the compressor for the cracked gases of the catalytic cracking unit.

5. An installation according to claim 1 and further comprising an intermediate column C-3 fed by an intermediate fraction issuing from the main fractionating column C-1.

6. An installation according to claim 1 and further comprising a stripper C-4 upstream of the fractionating column C-1, fed by the bottoms flow from the vessel B-3 or B-1, said stripper C-4 permitting elimination of a gas part, issuing from the reactions of the reaction section R-1, which is passed to the recovery compressor K-11.

7. A hydrotreatment or hydroconversion process comprising subjecting a hydrocarbon feedstock to hydrotreatment or hydrocracking in an installation according to claim 1.

8. A process according to claim 7 wherein the operating conditions of the hydrotreatment or hydroconversion reaction section R-1 are the following:
   the temperature is between about 200 and about 460° C.,
   the total pressure is between about 1 MPa and about 20 MPa,
   the overall hourly space velocity of liquid feedstock for each catalytic step is between about 0.1 and about 12,
   the purity of the hydrogen used in the process according to the invention is between 50 and 100% by volume, and
   the amount of hydrogen in relation to the liquid feedstock is between about 50 and about 1200 Nm3/m3.

9. A process according to claim 7 wherein the operating conditions of the catalytic cracking section R-11 are the following:

the reaction zone outlet temperature is between about 470 and about 650° C., the outlet pressure of the reaction zone is between about 0.05 MPa g and about 2.25 MPa g, the residence time of the feedstock in the reaction zone is between about 0.5 seconds and about 20 seconds, and the amount of circulating catalyst related to the amount of injected fresh feedstock is between about 3 and about 25 m3/m3.

10. A process according to claim 7 wherein the intermediate fraction is extracted from the fractionating column C-1, said intermediate fraction being passed into an intermediate column C-3 and the bottoms fraction of the column C-3 being cooled by means of an exchanger E-4.

11. A process according to claim 7 wherein the pressure of the separation column C-4 is selected to be sufficiently high for the acid gases issuing from said separation operation to be directed towards an intermediate stage of the compressor K-11 for the cracked gases of the catalytic cracking section R-11.

12. A process according to claim 7 wherein the pressure of the separation column C-5 is selected to be sufficiently high for the acid gases issuing from said separation operation to be directed towards an intermediate stage of the compressor K-11 for the cracked gases of the catalytic cracking section R-11.

13. An installation according to claim 6, wherein the gas part is $H_2S$.

* * * * *